(12) United States Patent
Vuorinen et al.

(10) Patent No.: US 6,847,689 B1
(45) Date of Patent: Jan. 25, 2005

(54) METHOD FOR DISTINGUISHING SIGNALS FROM ONE ANOTHER, AND FILTER

(75) Inventors: Olli Vuorinen, Oulu (FI); Tapio Seppänen, Oulu (FI); Juha Röning, Oulu (FI); Jorma Lilleberg, Oulu (FI); Timo Kolehmainen, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 729 days.

(21) Appl. No.: 09/619,905

(22) Filed: Jul. 19, 2000

(30) Foreign Application Priority Data

Dec. 16, 1999 (FI) ................................................. 992708

(51) Int. Cl.$^7$ ................................................. H04B 1/10
(52) U.S. Cl. ........................ 375/350; 375/285; 455/63; 455/570; 455/296
(58) Field of Search ................................. 375/350, 316, 375/346, 348, 285, 224; 455/63, 570, 67.3, 296, 501

(56) References Cited

U.S. PATENT DOCUMENTS

| | | | |
|---|---|---|---|
| 4,352,182 A | * 9/1982 | Billi et al. | 714/714 |
| 5,278,777 A | 1/1994 | Cummins | 364/574 |
| 5,307,460 A | * 4/1994 | Garten | 704/219 |
| 5,903,819 A | 5/1999 | Romesburg | 455/63 |
| 5,944,761 A | 8/1999 | Heiberg | 701/13 |
| 5,956,262 A | 9/1999 | Comminges et al. | 364/724.16 |

FOREIGN PATENT DOCUMENTS

| | | |
|---|---|---|
| EP | 0926839 A2 | 6/1999 |
| EP | 0961406 A3 | 12/1999 |
| WO | WO 94/08396 | 4/1994 |
| WO | WO 97/19523 | 5/1997 |
| WO | WO 99/50679 | 10/1999 |

OTHER PUBLICATIONS

Japanese Document No. JP 62132435, 1987. (English Translation Of The Abstract).

"Periodic Interference Rejection Using Coherent Sampling And Waveform Estimation", P. Heinonen et al., IEEE Transactions On Circuits And Systems, pp. 438–446, vol. Cas–31, No. 5, 1984.

"A Learning Filter For Removing Noise Interference", G.S. Furno et al., IEEE Transactions On Biomedical Engineering, vol. BME–30, No. 4, 1983.

* cited by examiner

*Primary Examiner*—Jean B. Corrielus
(74) *Attorney, Agent, or Firm*—Perman & Green, LLP (57) ABSTRACT

The invention relates to a method and a filter for distinguishing signal components from one another, whereof at least one comprises a periodic signal sequence. In the solution samples are taken during several signal sequences (300) and a signal sequence model is formed by arranging the samples taken from several signal sequences (300) together so that the samples represent a single signal sequence (300) model and the signal sequence model is specified by filtering.

28 Claims, 6 Drawing Sheets

METHOD FOR DISTINGUISHING SIGNALS FROM ONE ANOTHER, AND FILTER

FIELD OF THE INVENTION

The invention relates to distinguishing two or more signal components from one another, when at least one signal component is periodic.

BACKGROUND OF THE INVENTION

In general, electronic equipment cause frequently occurring electromagnetic interference to the environment and to the operation of the equipment. Electromagnetic interference is often caused by regular activity associated with the operation or power supply of the equipment. Interference can be removed by means of frequency domain or time domain signal processing. However, a useful signal and an interfering signal cannot be distinguished from the frequency domain interference cancellation and some of the useful signals are therefore also removed during interference cancellation. For reducing periodic interference, the time domain signal processing employs, for example, coherent averaging where more than one signal sequences are co-phased and summed together for determining the average form of a single signal sequence. The solution can be improved by relating a sampling frequency to the occurrence frequency of a periodic signal by observing the minor changes in the occurrence frequency too. Such a solution is described in the publication Periodic Interference Rejection Using Coherent Sampling and Waveform Estimation, Heinonen, P., Saramaki, T., Malmivuo, J., Neuvo, Y., IEEE Transactions on Circuits and Systems, p. 438–446, vol. Cas-31, no. 5, May 1984, which is incorporated herein by reference.

A similar result is obtained also in the time domain signal processing, if a learning filter is used that learns the form of the interference and reduces the interference from the signal to be processed. Such a solution is described in the publication A Learning Filter for Removing Noise Interference, Furno, G., S., Tompkins, W., J., IEEE Transactions on Biomedical Engineering, Vol. BME-30, no. 4, April 1983, which is incorporated herein by reference.

However, the problem with these solutions is that an interfering signal and a useful signal cannot be accurately distinguished from one another particularly in such cases in which the amplitude of a periodic interfering signal varies or when the useful signal occasionally arrives at the same frequency band together with the interfering signal. Consequently, the interference cancellation is not successful or the interference cancellation also eliminates a significant part of the useful signal.

BRIEF DESCRIPTION OF THE INVENTION

It is an object of the invention to provide a method and a filter implementing the method so as to avoid or reduce the above problems. This is achieved with the method of the type described in the preamble for distinguishing signal components from a signal comprising at least two signal components, whereof at least one forms a periodic signal sequence, and digital samples are taken from the signal. The method also comprises the steps of distinguishing at least one periodic signal component from the signal and taking samples from the signal sequences of the periodic signal component during several periods, and forming a signal sequence model by arranging the samples taken from several signal sequences together so that the samples represent a combined signal sequence in order for the samples of the other signal components to fall into temporally disorder, and filtering the signal sequence model for specifying the desired signal component.

The invention also relates to a filter for distinguishing signal components from one another from a signal including digital samples and the signal comprising at least two signal components, whereof at least one comprises a periodic signal sequence. The filter is also arranged to distinguish at least one periodic signal component from the signal and the filter is arranged to arrange the samples taken from the signal sequence during several periods to a single signal sequence model so that the samples represent a combined signal sequence in order for the samples of the other signal components to fall into disorder, and the filter is arranged to filter the signal sequence model for specifying the desired signal component.

The preferred embodiments of the invention are disclosed in the dependent claims.

The invention is based on the idea that the samples of the signal sequences are rearranged so as to obtain a signal sequence model which is specified by filtering the interferences. The filtered model allows to form an accurate periodic signal or a combination of other signal components included in the signal.

Several advantages can be achieved with the method and arrangement of the invention. An interfering signal and a useful signal can efficiently be distinguished from one another also when the interfering signal occasionally appears on the same frequency band as the useful signal frequency or when the amplitude of the interfering signal varies.

BRIEF DESCRIPTION OF THE DRAWINGS

In the following the invention will be described in greater detail by means of the preferred embodiments with reference to the accompanying drawings, in which FIG. 4E shows a distinguished interfering signal.

DETAILED DESCRIPTION OF THE INVENTION

The solution of the invention can be applied, for example, for removing periodic interference, searching for sequential signal components, and for monitoring electronic equipment. The invention can in particular be applied for distinguishing signals of an audio part of a mobile phone in a radio system based on time division, however, without restricting thereto. The inventive solution relates to one or more periodic signal components so as to distinguish one or more periodic signal components from one another or from other signal components. The inventive solution does not tend to distinguish non-periodic signal components from one another.

Figure 1:
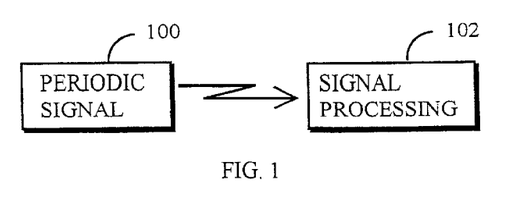
FIG. 1 shows the source of a periodic signal and an electric circuit receiving interference.

FIG. 1 shows a situation which occurs in the inventive solution in which a transmitter part 100 sends periodic signal component at a radio frequency. Even though the transmission is not intended for an electronic circuit 102, the signal component connects to the electronic circuit 102 and interferes with the signal processing occurring therein. The transmitter part 100 and the electronic circuit 102 can be included as parts in the same or in a different apparatus. Such a situation occurs for example in a GSM radio system terminal, such as a mobile phone. Then, a part of the GSM transmission sent by the transmitter part 100 of the terminal falls on the electric circuit 102 of the audio part of the terminal and interferes with the audio signal therein.

Figure 2A:
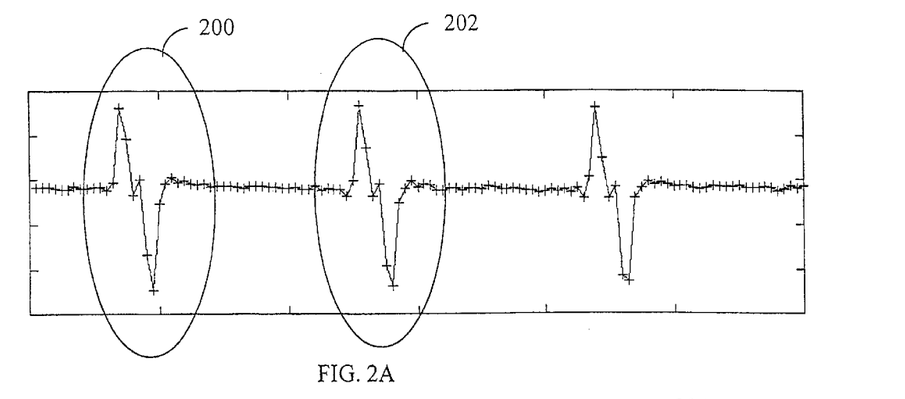
FIG. 2A shows sampling at a frequency which is not a multiple of the occurrence density of a signal sequence.

In the following, the invention will be described using as examples a bursty transmission from the transmitter part of the terminal in the GSM radio system and the effect of such a bursty transmission on the audio part of the terminal. The recurrence density of a bursty signal sequence in the GSM radio system (FIG. 2A, reference numerals 200, 204) is 216.67 Hz (216⅔ Hz). FIG. 2A illustrates digital samples which are taken from the audio signal of the electronic circuit in the audio part of the terminal at a frequency of 8 kHz. Such a sample frequency is not a multiple of the recurrence density of the signal sequence, i.e. the division result between a sample frequency and an occurrence frequency of the signal sequence is not an integer (8000/216.67≈36.92). The sampling positions therefore occur in different phases of a signal sequence in consecutive signal sequences. By composing the signal sequences of different phases to an over-sampled model, a signal sequence model is obtained that corresponds to a model sampled using a higher sampling rate. By multiplying the sampling rate by the number of signal sequences of different phases included in the over-sampled model, the sampling rate 13★8 kHz= 104 kHz corresponding to the over-sampled model is achieved.

Figure 2B:
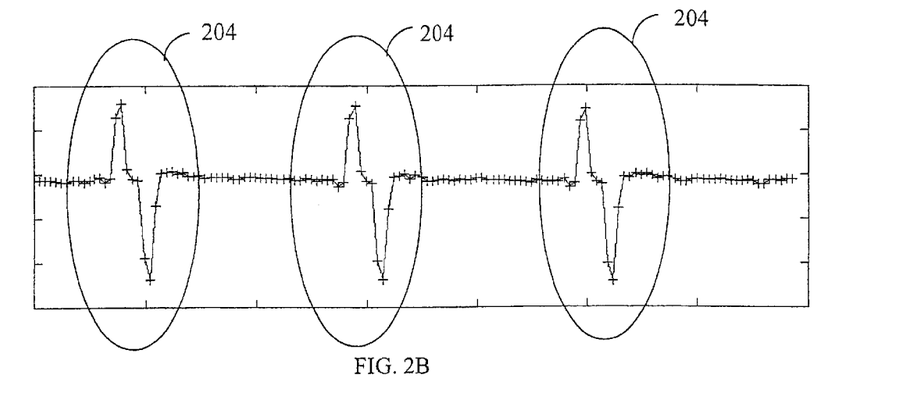
FIG. 2B shows sampling at a frequency which is a multiple of the occurrence density of the signal sequence.

The situation in FIG. 2B is very similar to the one in FIG. 2A, except that the sampling frequency is now 9.1 kHz. In this case the sample frequency is a multiple of the occurrence frequency of the signal sequence, i.e. the division result between the sample frequency (corresponds to the sampling frequency) and the occurrence frequency of the signal sequence is the integer (9100/216.67=42) and the samples are taken in consecutive signal sequences 204 from the same positions without a phase shift.

Figure 3:
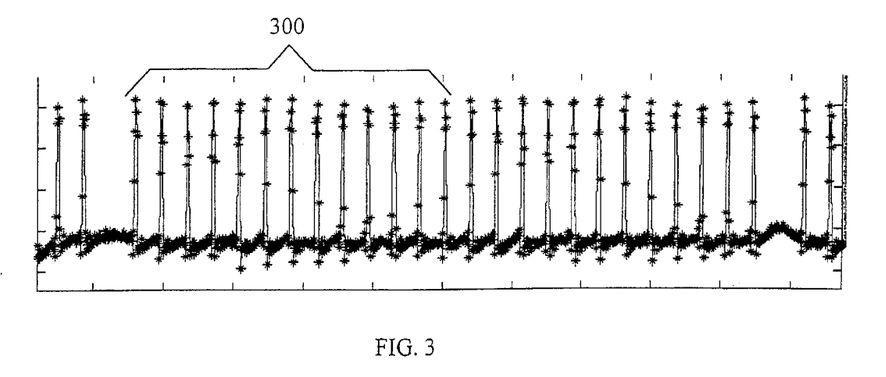
FIG. 3 shows a cyclostationary sample line.

Let us now take a closer look at the inventive solution shown in FIG. 3 where the sampling frequency and therefore also the sample frequency is 8 kHz and the periodic signal sequence appears at a frequency of 216.67 Hz. Such a sample line is cyclostationary and the length of one cycle is 13 signal sequences. Cyclic stationarity refers to a statistical feature, such as an average, standard deviation or correlation, that occurs regularly. The phase shift of sampling is clearly visible from thirteen signal sequences 300. Since the division result between the sample frequency and the occurrence frequency of the signal sequence is not an integer, the sample line is cyclostationary, in which the samples of the consecutive signal sequences belong to a signal sequence of a different phase. In this case, an over-sampled model of a single signal sequence is formed in the inventive solution during at least one cycle from a cyclostationary sample line by arranging the samples taken from the different phases of the signal sequence in consecutive order to form a sample line representing one signal sequence. Mathematically indicated, the signal processing operation is the following. Let us take the consecutive samples $X=[S_{1,1}S_{1,2}\ldots S_{1,i-1}S_{1,i}S_{2,1}S_{2,2}\ldots S_{2,i}\ldots S_{j,i-1}S_{j,i}]$, where $S_{1,1}$ is the first sample of the first signal sequence, $S_{1,i}$ is the last sample of the first signal sequence, $S_{1,i}$ is the number of samples taken from the signal sequence and $S_{j,i}$ is the last sample of the last signal sequence, j is the number of signal sequences in the cycle. Any part of the signal sequence can freely be selected as the first sample. Let us now convert vector X into matrix form, in which the lines correspond to samples taken from different signal sequences. Thus, matrix A is obtained from vector X:

$$A = \begin{bmatrix} S_{1,1} & S_{1,2} & \ldots & S_{1,i-1} & S_{1,i} \\ S_{2,1} & S_{2,2} & \ldots & & S_{2,i} \\ \vdots & & \ddots & & \vdots \\ S_{j-1,1} & & & & S_{j-1,i} \\ S_{j,1} & S_{j,2} & \ldots & S_{j,i-1} & S_{j,i} \end{bmatrix}.$$

When a transpose $A^T$ is taken from matrix A and when the transposed matrix $A^T$ is correspondingly converted into vector mode, vector Y of the form $Y=[S_{1,1}S_{2,1}\ldots S_{j-1,1}S_{j,1}S_{1,2}S_{2,2}\ldots S_{j,2}\ldots S_{j-1,i}S_{j,i}]$ is obtained. The sample line of vector Y is an over-sampled model of a single signal sequence. The over-sampled model can be specified for example by filtering the over-sampled model and by calculating an average of several over-sampled models.

Figure 4A:
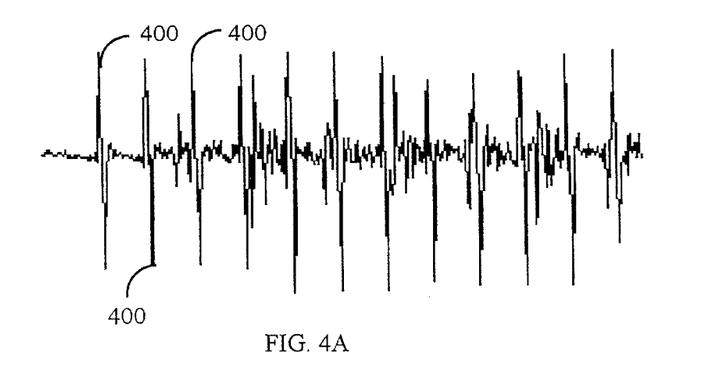
FIG. 4A shows a signal of an audio part in a radio system terminal comprising periodic interference and an audio signal.
Figure 4B:
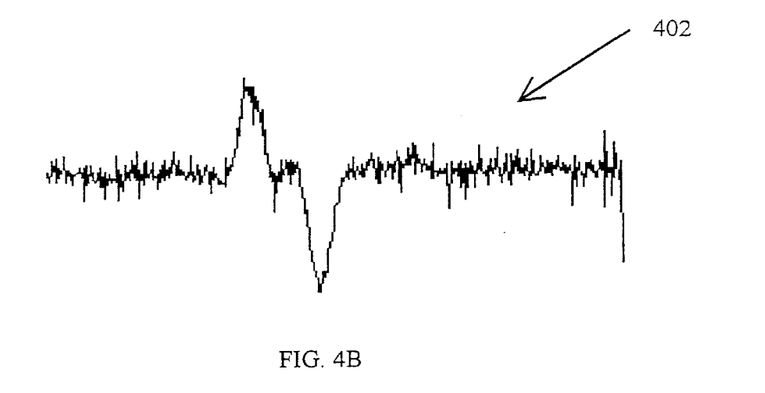
FIG. 4B shows an over-sampled interfering signal sequence.
Figure 4C:
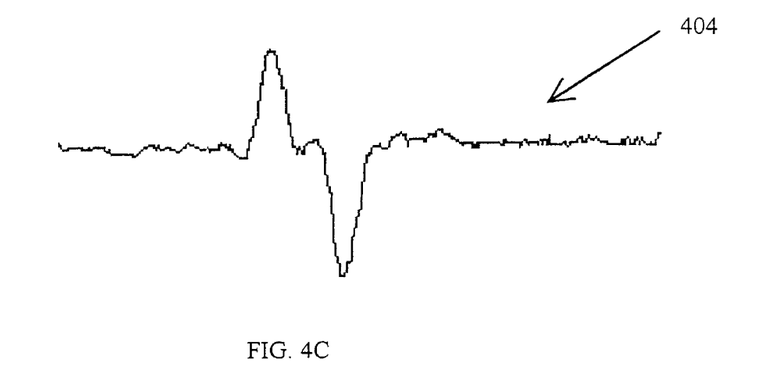
FIG. 4C shows a filtered over-sampled interfering sequence.
Figure 4D:
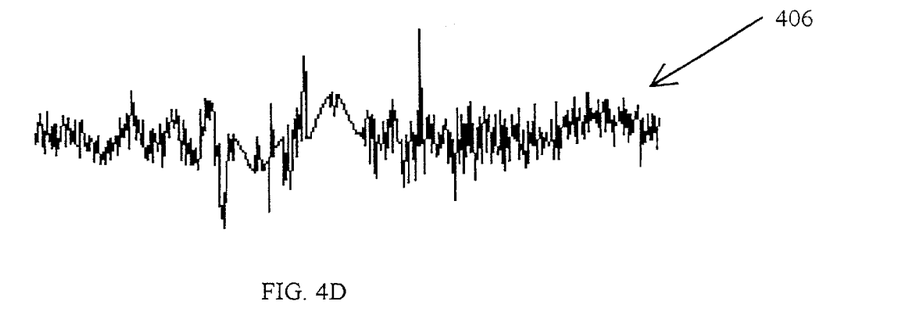
FIG. 4E shows an audio signal on the over-sampled interfering portion.
FIG. 4F shows a distinguished audio signal.
Figure 4E:
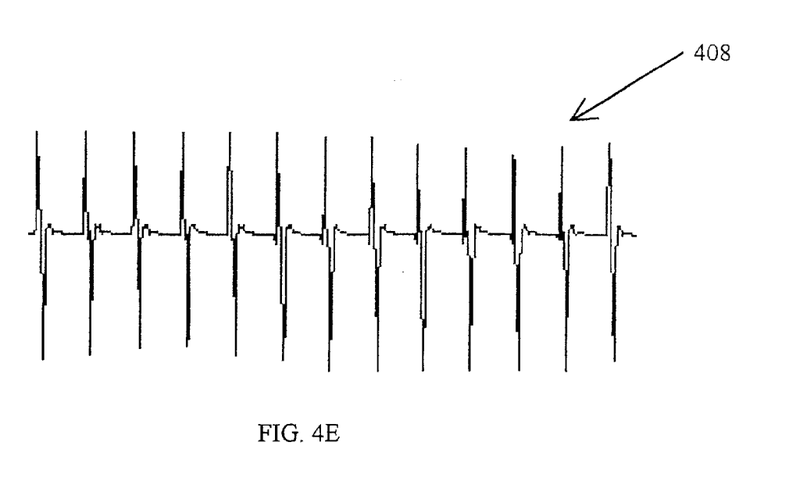
Figure 4F:
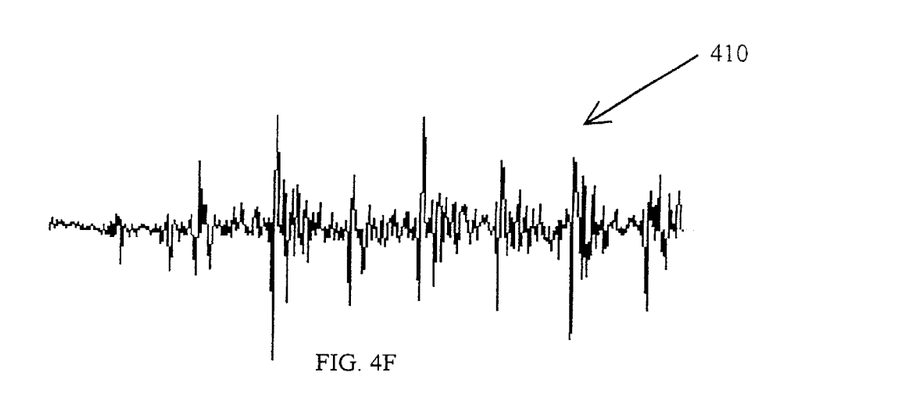

Let us now take a closer look at the inventive solution by means of FIGS. 4A to 4F. FIG. 4A shows an audio signal of the audio part in the radio system terminal, the audio signal being interfered by regular bursts 400 of the terminal. FIG. 4B shows an over-sampled model 402 of the burst representing the signal sequence. An important feature of the inventive solution is that in the over-sampled signal sequence model the other signals change into a signal resembling noise or into a deterministic signal, the frequency band of which is not the same as the frequency band of the over-sampled model, i.e. the rearrangement of the samples into a reasonable order as regards the signal sequence renders the samples in disorder regarding the other signals. The rearrangement is a kind of conversion operation to be carried out in the signal space. In this case, the audio signal samples, which are now in random order, are summed on top of the over-sampled burst and appear as noise. As the frequency bands deviate from each other, the signal components can be distinguished from one another. In FIG. 4C, the over-sampled signal sequence model is filtered in order to search for a trend and/or to reduce noise, in which case an accurate form is obtained from the signal sequence model. The detectors of the trend are filters known as such retrieving the signal according to a particular model among the signals (used for example in FIG. 6E). A filtered signal sequence model 404 corresponds in the example case to the form of 13 common pulses and from this over-sampled model 13 filtered pulses can be provided by restoring the samples into the original order or by performing a inverse transformation in the signal space. The filtering may be, for example, band-pass filtering, median filtering, averaging filtering or any known filtering reducing noise at least slightly. FIG. 4D shows an audio signal 406 in the over-sampled part resembling noise. The audio signal has remained while the signal in FIG. 4C has been removed from the signal in FIG. 4B. FIG. 4E shows a burst line 408 which is obtained by restoring the samples in FIG. 4C into the original order. FIG. 4F shows an audio signal 410 filtered by the inventive method, the signal being obtained by restoring the samples in FIG. 4D into the original order.

Even though the sampling frequency and thus also the sample frequency would be a multiple of the occurrence density of the signal sequence, the inventive solution can excellently be applied. In such a case, samples are taken during several signal sequences and a signal sequence model is formed by arranging the samples taken from several signal sequences together so that the samples represent a signal sequence which is not over-sampled in this case. The arrangement of the samples causes the other signal component samples to fall into disorder and are shown as interference resembling noise in the signal sequence. This occurs in the same way as in the case where the sample frequency is not a multiple of the occurrence density of the signal sequence. After this the signal processing continues as described in such a manner that the signal sequence is filtered in order to reduce noise.

When the sample frequency is a multiple of the occurrence density of the signal sequence, the sample frequency can be changed so as to alter the sampling frequency as such that it is not the multiple of the occurrence density of the signal sequence.

However, when the signal components cannot be adequately well distinguished, the inventive solution often allows to monitor the amplitude of the periodic signal component. Then the previously measured periodic signal component can be removed from the signal to be processed, as long as the amplitude of the previously measured signal component is correctly adjusted. The amplitude of the previously measured periodic signal component can be correctly arranged by means of monitoring. If the amplitude is not corrected, the variation of the interfering signal amplitude deteriorates the filtering result. The amplitude is corrected in such cases, in which the signals are not distinguished very well. This occurs in particular when the audio signal of the radio system terminal is significantly stronger than the interfering signal. In the GSM mobile system the situation can be improved by forming the signal sequence estimate of the interfering signal caused by the terminal burst when speech is not sent. When speech is sent, the amplitude of the signal sequence estimate is amended by multiplying the previously formed signal estimate by the coefficient obtained by monitoring, the coefficient arranging the amplitude of the signal sequence estimate to the speech transmission situation. The coefficient is changed by means of monitoring according to how the power (or amplitude) changes in the consecutive over-sampled signal sequence models from which speech has been removed. The reliability of the amplitude adaptation can be improved with the following measures. (1) Synchronizing the consecutive over-sampled signal sequence models to each other for comparison, since the phasing of the over-sampled models changes for example on account of drifting and changing the TDMA system parameters. (2) A masking vector can be used to remove the points from the over-sampled signal sequence in which the signal-to-noise-ratio is high. (3) A step restrictor can be used to prevent sudden changes which are most likely caused by the audio signal. (4) Amplitude adaptation can be controlled during the transmission of the audio signal by measuring the RMS error (Residual Mean Square).

In synchronization (1), the arrangement of two over-sampled models together indicates that the difference between the two reaches the minimum, i.e. MMSE (Minimum Mean Square Error) synchronization is concerned. Synchronization provides the advantage that filtering the model allows to remove interfering components such as speech, which could cause the minimum of the difference to move slightly from the correct position. Thus, forming and filtering the over-sampled model may improve the synchronization in cases where noise is coloured like speech.

Let us now take a closer look at said operations. The over-sampled signal sequence model is synchronized to the following model, for example, in the following way. Utilizing the known TDMA timing data sent by the transmitter, whereby the filter of the invention and the over-sampled models are synchronized according to the timing sent by the transmitter. Then the possible drifting of the model is removed. Another alternative is to estimate the timing of the data sent by the transmitter and to synchronize the over-sampled models on the basis of the estimated timing. The over-sampled models can also be synchronized by means of the arranged filter or the MMSE error. When using the MMSE method in which the mean square deviation is calculated between two over-sampled models, the synchronization is at its best when the MMSE error is the smallest. The phase of the signal sequence can be monitored using synchronization.

Figure 5:
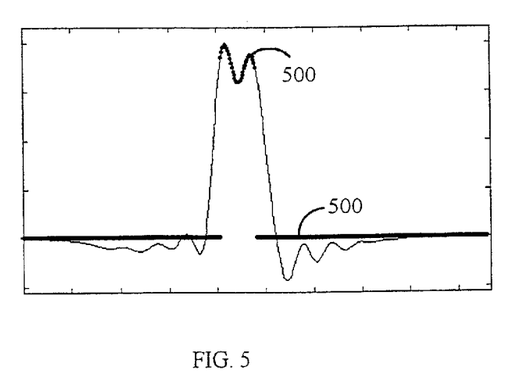
FIG. 5 shows a masked signal sequence.

FIG. 5 shows the use of a mask vector for determining the limits of an over-sampled signal sequence. As is obvious for those skilled in the art, a mask vector 500 defines the value of the amplitude of the over-sampled signal sequence as 0 as long as the amplitude exceeds (or goes below) a predetermined threshold value. The amplitudes exceeding the predetermined threshold value remain as the values of the signal sequence amplitudes or they obtain values that deviate from zero, the values being in relation to the original amplitude values. Another possibility to restrict the over-sampled signal sequence amplitudes is to measure the value of the highest amplitude and to take into account a predetermined number of sample amplitudes on both sides of the highest amplitude. The predetermined number on the left side of the highest value may be different than the one on the right side, particularly if the signal sequence is not symmetrical in relation to the highest amplitude value.

The amplitudes of consecutive over-sampled signal sequences may vary to a great extent and some of the changes are caused by interference. This weakens the efficiency of distinguishing signals. One way to reduce the effect of interference is to restrict the amplitudes of the consecutive over-sampled signal sequences by employing a step restricter, the step of which is the predetermined highest amplitude change between two consecutive signal sequences. In such a case the amplitude of the over-sampled signal sequence is increased or reduced by multiplying the signal sequence samples by an appropriate coefficient so that the highest (lowest) amplitude of the new signal sequence deviates from the highest (lowest) amplitude of the previous signal sequence by a predetermined step at the most.

The amplitude adaptation is limited, when the signal-to-noise ratio is high and the signal components overlap each other in both the frequency and time space. The reliability of the amplitude adaptation can be measured using an RMS error, which is performed so as to compare the new signal sequence to a previous signal sequence using an average sum of the square differences in the samples. The previous signal sequence model does not include useful signal, meaning that is formed at a point in which no useful signal was present, or the effect of the useful signal was insignificant. In order to determine the similarity of the models, the samples of both models are divided by the maximum amplitude of the model. The RMS error is calculated, for example, as follows $$\text{RMS} = \sum_{i=1}^{N} (S_j(i) - S_k(i))^2,$$

where $S_j$ represents the samples of the first signal sequence and $S_k$ represents the samples of the second signal sequence and i is the index of the sample. The RMS error indicates how much residual audio component remains in the over-sampled signal sequence model. The enclosed table shows an example of the threshold values and the weighting coefficients corresponding thereto, which allow to control the amplitude adaptation at a point where the useful signal interleaves partly or totally with the interfering signal. The proportional RMS error in the table is calculated in relation to the previous model by dividing the obtained energy of the RMS error by the energy of the previous model.

| RMS | weighting value of the previous amplitude | weighting value of the new amplitude |
| --- | --- | --- |
| –>0.01[ | 0 | 1 |
| [0.01–0.03[ | 1/5 | 4/5 |
| [0.03–0.05[ | 1/3 | 2/3 |
| [0.05–0.10[ | 1/2 | 1/2 |
| [0.10–0.25[ | 2/3 | 1/3 |
| [0.25–0.5[ | 4/5 | 1/5 |
| [0.5–> | 1 | 0 |

The weighting values are employed when the amplitude value is changed. In other words, when the reliability of the new amplitude is insignificant, the previous amplitude is mainly used as the signal sequence amplitude. For example, when the RMS value is 0.04, the new amplitude obtained is A=A1 •1/3+A2 •2/3, where A1 is the value of the previous amplitude and A2 is the value of the new amplitude.

In the previous amplitude adaptation the adaptation may begin only when the signal sequence of the interfering signal component is at first measured without an audio signal component. However, the amplitude adaptation can also be performed when the signal sequence of the interfering signal is formed during the transmission of the audio signal component. The amplitude adaptation can be specified as soon as the first signal sequence model is measured at a particular moment without audio signals.

Figure 6A:
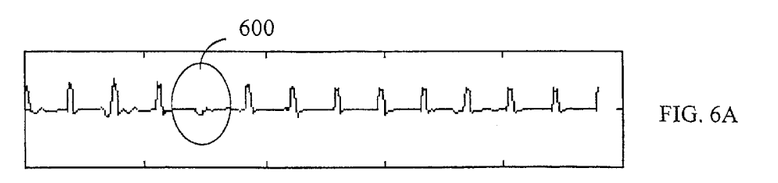
FIG. 6 shows a line of bursts that lacks one burst.
Figure 6B:
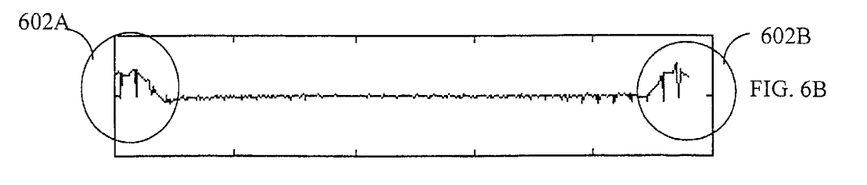
FIG. 6B shows an over-sampled signal sequence model of the burst.
Figure 6C:
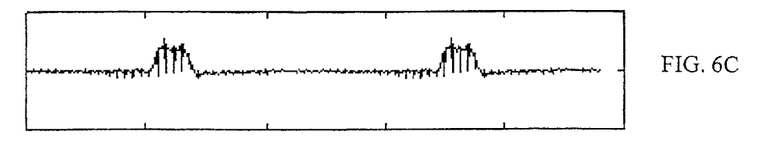
FIG. 6C shows an extended over-sampled sample line.
Figure 6D:
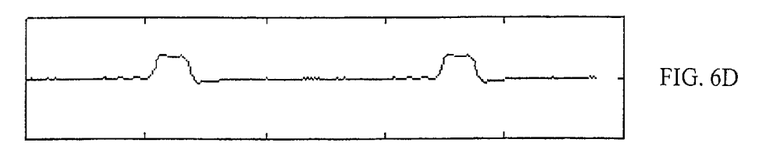
FIG. 6D shows a median-filtered over-sampled interfering sequence.
Figure 6E:
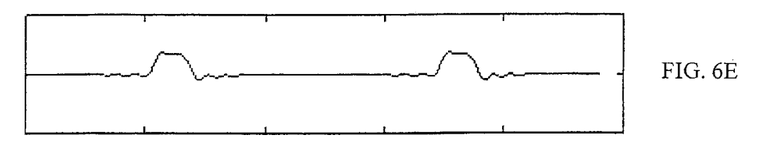
FIG. 6E shows a wavelet-filtered over-sampled interfering sequence.
Figure 6F:
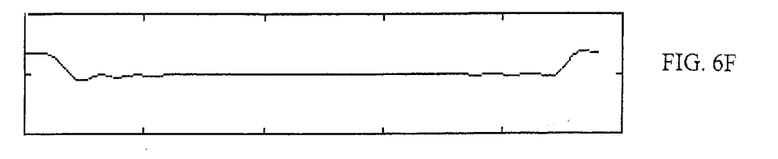
FIG. 6F shows a filtered over-sampled interfering sequence restored into its original length.
Figure 6G:
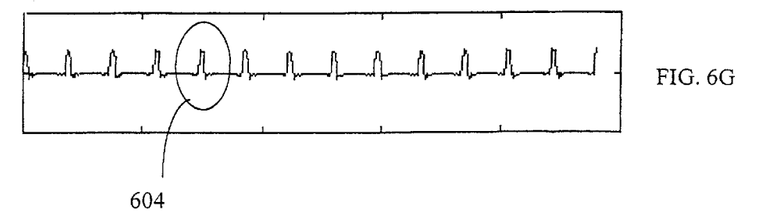
FIG. 6G, shows a supplemented over-sampled interfering sequence.

FIG. 6A is a situation described in a particular time window, where step 600 lacks a pulse-like signal sequence. Said sequence may be for example a bursty transmission interference of a mobile phone in an audio part of a mobile phone. FIG. 6B shows how an over-sampled model is formed of the pulse. In this case, the pulse partly 602A remains in the beginning of the window to be examined and partly 602B at the end of the time window. The original time window has been continued by cyclically copying correctly phased samples to both ends of the time window. The over-sampled model is continued in FIG. 6C, in which case two pulses are obtained entirely to the time window. The time window in FIG. 6D illustrates the signal in FIG. 6C which is median filtered. The time window in FIG. 6E illustrates the signal in FIG. 6D which is wavelet filtered. In FIG. 6F the continued time window in FIG. 6E is canceled, whereby a filtered pulse figure corresponding to the situation shown in FIG. 6B is obtained. The inventive solution allows to form a pulse-like signal sequence and to estimate a pulse 604 using the signal sequence at point 600 of the lacking pulse shown in FIG. 6G.

Figure 7:
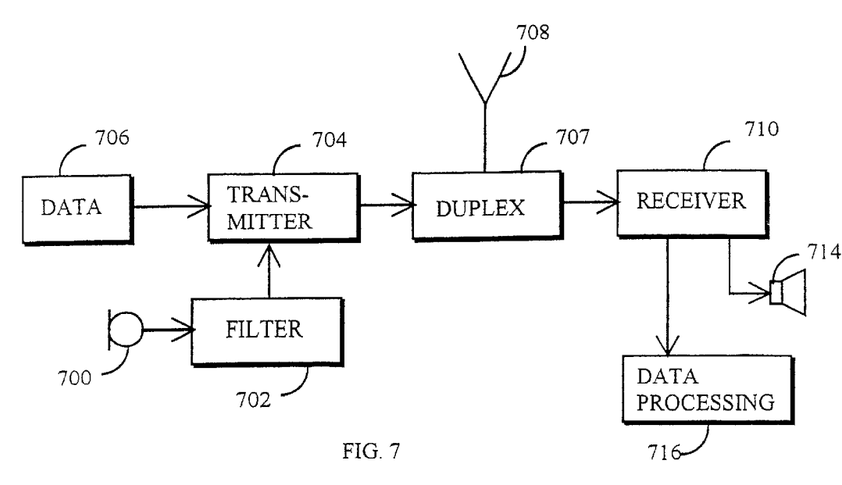
FIG. 7 is a block diagram showing a radio system terminal.

FIG. 7 shows an example of how the inventive solution can be applied. FIG. 7 shows a GSM radio system terminal comprising a microphone 700 for transmitting signal, an inventive filter 702, a transmission circuit 704, a data feeding means 706, a duplex filter 707 and an antenna 708. The microphone 700 enables to convert the speech of the user into electric signal. The terminal can be used for sending data using the means 704, which may be for example a keyboard or a computer connected to the terminal. The data may include alphabetical and numerical data such as telephone numbers, text messages, e-mail messages etc. The transmission circuit 704 converts the speech or data to be sent into a bursty radio frequency signal, which is sent after the duplex-filter 707 through the antenna 708 as electromagnetic radiation to the base station (not shown in the Figure). The duplex filter 707 distinguishes the transmission and reception circuits from one another so that a powerful transmission signal would not damage the susceptible receiver.

The antenna 708 receives electromagnetic radiation that the duplex filter 707 releases to the reception circuit 710. The reception circuit 710 converts the signal at the radio frequency into an audio signal which is fed into a loudspeaker 714. The data signal is fed into a data processing circuit 716, the existence or operation of which is not relevant for the invention.

The inventive solution can thus be used for interference cancellation, for searching a periodic signal component or for monitoring the amplitude and/or phase of the periodic signal component. The inventive solution is used for searching a periodic signal component so as to arrange the samples in the filter together according to different periods to be searched. After this the energy of the samples arranged according to each period, and when filtering has at first been used for reducing the effect of other components from said periodic over-sampled model. Then, at least one measured energy obtaining the maximum is searched for. The maximum energy indicates that a signal sequence is found that recurs during the searched period. Finally a period corresponding to the maximum is determined, the period corresponding to the searched signal sequence period. It is preferable to determine a predetermined threshold value for the maximum. The maximum has to exceed the threshold value so that the energy maximums caused by noise or other interference would not result in erroneously measuring the period. The amplitude and/or phase of the periodic signal component is monitored by comparing the formed signal sequence amplitude and/or phase to the previous signal sequence amplitude and/or phase.

When the power of one or more other signal components exceeds the predetermined power limit in a filtered signal sequence model, the model to be used is the one that is obtained previously when the power of one or more other signal components goes below the predetermined power limit in the filtered signal sequence model.

Figure 8:
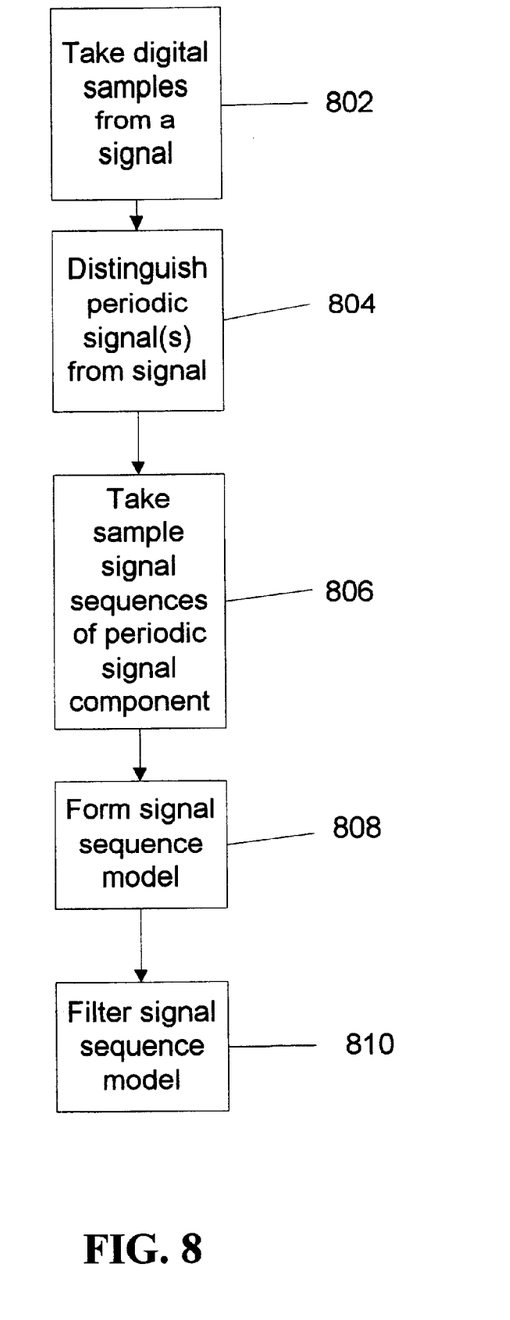
FIG. 8 is a flowchart illustrating one embodiment of a method incorporating features of the present invention.

FIG. 8 is a flowchart illustrating one embodiment of a method incorporating features of the present invention. Samples, such as digital samples, are taken 802 from a signal comprising at least two signal components where at least one forms a periodic signal sequence. At least one periodic signal component is distinguished 804 from the signal. Samples are taken 806 from the signal sequences of the periodic signal components during several periods. The samples can include samples taken from the signal during several signal sequences forming a cyclostationary sample line, in which the samples belong to signal sequences of different phases. A signal sequence model is formed 808 by arranging the samples taken from several signal sequences together so that the samples represent a combined signal sequence in order for the samples of the other signal components to fall into temporally disorder. In one embodiment, an over-sampled model of the signal sequence can be formed from the cyclostationary sample line during at least one cycle by arranging the samples taken from the different phases of the signal sequence into consecutive order as a sample line representing a single signal sequence. The signal sequence model can then be filtered 810 to specify a desired signal component. In the case of an over-sampled model, the sample line can be filtered in order to specify the desired signal component.

In one embodiment, a periodic signal component is formed during the several periods. The effect of other signal components are removed by filtering from the signal component by restoring the samples of the filtered signal sequence model back to the original order.

Even though the invention has above been explained with reference to the example in the accompanying drawings, it is obvious that the invention is not restricted thereto but can be modified in various ways within the scope of the inventive idea disclosed in the attached claims.

What is claimed is:

1. A method for distinguishing signal components from a signal comprising at least two signal components, whereof at least one of said at least two signals forms a periodic signal sequence, and digital samples are taken from the signal, comprising distinguishing at least one periodic signal component from the signal, taking samples from the periodic signal sequence of the distinguished periodic signal component during several periods, and forming a signal sequence model by arranging the samples taken from several periodic signal sequences together so that the samples taken from said several periodic signal sequences represent a combined signal sequence in order for the samples of the other signal components to fall into temporally disorder, and filtering the signal sequence model for specifying a desired signal component.

2. A method as claimed in claim 1, wherein when a sampling frequency and an occurrence frequency of the periodic signal sequence differs from an integer, the samples taken from the signal during several signal sequences form a cyclostationary sample line, in which the samples belong to signal sequences of different phases; whereby the method comprises the step of forming an over-sampled model of the signal sequence from the cyclostationary sample line during at least one cycle by arranging the samples taken from the different phases of the signal sequence into consecutive order as a sample line representing a single signal sequence, the sample line being filtered in order to specify the desired signal component.

3. A method as claimed in claim 1, comprising forming a periodic signal component during said several periods, the effect of other signal components being removed by filtering of said signal component and by restoring the samples of the filtered signal sequence model back to the original order.

4. A method as claimed in claim 1, comprising reducing the filtered signal sequence model from the signal sequence model and restoring the samples back to the original order, whereby a combination of the other signal components is formed during said several periods, the effect of the periodic signal component being removed from said combination.

5. A method as claimed in claim 1, wherein the signal component comprising the periodic signal sequence is an interfering signal which is removed from the signal in order to reduce interference.

6. A method as claimed in claim 1, wherein the method is used for searching the periodic signal component so as to arrange the samples together according to different periods to be searched, to measure the energy of the samples arranged according to each period, to search for at least one measured energy obtaining a maximum energy and to determine a period corresponding to the maximum energy, wherein the period corresponding to the maximum energy corresponds to a signal sequence period.

7. A method as claimed in claim 1, comprising monitoring the amplitude and/or phase of the periodic signal component by comparing a formed signal sequence amplitude and/or phase to a previous amplitude and/or phase of the signal sequence model.

8. A method as claimed in claim 1, wherein when the power of one or more signal components other than the desired signal component exceeds a predetermined power limit in the filtered signal sequence model, the model used as the signal sequence model is the one obtained previously when the power of one or more other signal components goes below the predetermined power limit in the filtered signal sequence model.

9. A method as claimed in claim 1, further comprising comparing a residual mean square (RMS) error formed by one or more signal components other than the desired signal component in the filtered signal sequence model and when the RMS error of one or more signal components other than the desired signal component exceeds a predetermined RMS error limit in the filtered signal sequence model the signal sequence amplitude data is weighted by a predetermined weighting coefficient and a previous signal sequence amplitude data is weighted by a second predetermined weighting coefficient for determining a new amplitude which is an average of previous and new amplitude data weighted in accordance with a reliability level determined by the RMS error.

10. A method as claimed in claim 9, comprising several predetermined RMS error limits and the size of the weighting coefficient depending on the exceeded RMS error limit.

11. A method as claimed in claim 1, wherein the signal is a signal of an audio part in a radio system terminal and the signal comprises a bursty transmission of the radio system terminal and the audio signal as the periodic signal components.

12. A method as claimed in claim 7, comprising performing amplitude adaptation in which a power change is monitored in consecutive over-sampled models, from which an audio signal is distinguished and removed.

13. A method as claimed in claim 1, comprising synchronizing in an amplitude adaptation over-sampled signal sequence models to one another for comparison.

14. A method as claimed in claim 1, comprising performing amplitude adaptation in which a power change is monitored in consecutive over-sampled models.

15. A method as claimed in claim 1, comprising filtering the signal sequence model using a trend detection method for specifying the desired signal component.

16. A filter for distinguishing signal components from one another from a signal including digital samples and the signal comprising at least two signal components, whereof at least one of said at least two signal components comprises a periodic signal sequence, said filter comprising:

means to distinguish at least one periodic signal component from the signal, means to take samples from the periodic signal sequence of the distinguished periodic signal component during several periods, means to arrange the samples taken from the periodic signal sequence during several periods to a single signal sequence model so that the samples taken from the periodic signal sequence represent a combined signal sequence in order for the samples of the other signal components to fall into temporal disorder, and means to filter the signal sequence model for specifying a desired signal component.

17. A filter as claimed in claim 16, wherein a sample frequency of the filter is arranged as such that the division result between the sample frequency and an occurrence frequency of the periodic signal sequence differs from an integer, whereby the samples taken from the signal during several signal sequences form a cyclostationary sample line in which the samples belong to signal sequences of different phases, means to form an over-sampled model of one signal sequence from the cyclostationary sample line during at least one cycle by arranging the samples taken from the different phases of the signal sequence into consecutive order as a sample line representing a single signal sequence that the filter is arranged to filter for specifying the desired signal component.

18. A filter as claimed in claim 16, further comprising means to form a periodic signal component during said several periods, the effect of other signal components are removed by filtering of said signal component and restoring the samples of the filtered signal sequence model back to the original order.

19. A filter as claimed in claim 16, wherein the filter is arranged to reduce the filtered signal sequence model from the signal sequence model and to restore the samples back to the original order, whereby a combination of the other signal components during said several periods is formed, and the effect of the periodic signal is removed from the desired signal component.

20. A filter as claimed in claim 16, wherein when the signal component comprising a periodic signal sequence is an interfering signal, the filter further comprising means to remove said interfering signal from the signal in order to reduce interference.

21. A filter as claimed in claim 16, wherein the filter further comprises means to search for at least one periodic signal component so as to arrange the filter to arrange the samples together according to different periods to be searched, to measure the energy of the samples arranged according to each period, to search for at least one measured energy including a maximum energy and to determine a period corresponding to the maximum energy, wherein the period corresponding to the maximum energy corresponds to a searched signal sequence period.

22. A filter as claimed in claim 16, wherein the filter further comprises means to monitor the amplitude and/or phase of the periodic signal sequence by comparing a formed signal sequence amplitude and/or phase to a previous signal sequence amplitude and/or phase.

23. A filter as claimed in claim 16, wherein the filter is in an audio part of a radio system terminal, the signal is an audio signal and the signal comprises bursty transmission of the radio system terminal as a periodic signal component and the audio signal as a second signal component.

24. A filter as claimed in claim 16, wherein the filter further comprises means to compare the power of one or more signal components other than the periodic signal component in the filtered signal sequence model and when the power of one or more signal components other than the desired periodic signal component exceeds a predetermined power limit in the filtered signal sequence model, the filter is arranged to use as the signal sequence model the model obtained previously when the power of one or more signal components other than the desired periodic signal component goes below the predetermined power limit in the filtered signal sequence model.

25. A filter as claimed in claim 16, wherein the filter further comprises means to compare a residual mean square (RMS) error formed by one or more signal components other than the desired periodic signal component in the filtered signal sequence model and when the RMS error of one or more signal components other than the desired periodic signal component exceeds a predetermined RMS error limit in the filtered signal sequence model, the filter is arranged to weight the signal sequence amplitude data by one predetermined weighting coefficient and a previous signal sequence amplitude data by a second predetermined weighting coefficient for determining a new amplitude which is an average of previous and new amplitude data weighted in accordance with a reliability level determined by the RMS error.

26. A filter as claimed in claim 16, wherein the filter includes several predetermined RMS error limits and the size of the weighting coefficient depends on the exceeded RMS error limit.

27. A filter as claimed in claim 22, further comprising means to synchronize in an amplitude adaptation over-sampled signal sequence models to one another for comparison.

28. A filter as claimed in claim 16, wherein the filter further comprises means to filter the signal sequence model using a trend detection method for specifying the desired signal component.

* * * * *